US007921238B2

(12) United States Patent
Sakai et al.

(10) Patent No.: US 7,921,238 B2
(45) Date of Patent: Apr. 5, 2011

(54) USB HOST SYSTEM AND METHOD FOR TRANSFERRING TRANSFER DATA

(75) Inventors: Ryo Sakai, Osaka (JP); Shinichi Egashira, Osaka (JP)

(73) Assignee: Panasonic Corporation, Osaka (JP)

( * ) Notice: Subject to any disclaimer, the term of this patent is extended or adjusted under 35 U.S.C. 154(b) by 246 days.

(21) Appl. No.: 12/130,155

(22) Filed: May 30, 2008

(65) Prior Publication Data

US 2008/0301330 A1 Dec. 4, 2008

(30) Foreign Application Priority Data

Jun. 1, 2007 (JP) ................................. 2007-147229

(51) Int. Cl.
*G06F 13/28* (2006.01)
(52) U.S. Cl. .......................................... 710/33; 709/236
(58) Field of Classification Search .................... 710/33; 709/236

See application file for complete search history.

(56) References Cited

U.S. PATENT DOCUMENTS

| 5,043,873 | A | * | 8/1991 | Muramatsu et al. | .......... 711/119 |
| 6,076,139 | A | * | 6/2000 | Welker et al. | .................. 711/104 |
| 6,609,179 | B1 | * | 8/2003 | Takinosawa | ................... 711/152 |
| 2006/0179202 | A1 | | 8/2006 | Nagao et al. | |

FOREIGN PATENT DOCUMENTS

WO    WO 03/079200 A2    9/2003

* cited by examiner

*Primary Examiner* — Henry W Tsai
*Assistant Examiner* — Juanito C Borromeo
(74) *Attorney, Agent, or Firm* — McDermott Will & Emery LLP

(57) ABSTRACT

A USB host system includes: a USB host module having a USB host function for performing USB transfer to/from a USB device; a different-function module having a predetermined function using transfer data that is to be an object of the USB transfer; at least one shared memory shared between the USB host module and the different-function module; and at least one dedicated memory exclusively used by the USB host module. At least part of management data for performing the USB transfer is stored in the dedicated memory.

2 Claims, 12 Drawing Sheets

USB HOST SYSTEM AND METHOD FOR TRANSFERRING TRANSFER DATA

CROSS-REFERENCE TO RELATED APPLICATIONS

This application claims priority under 35 U.S.C. §119 on Patent Application No. 2007-147229 filed in Japan on Jun. 1, 2007, the entire contents of which are hereby incorporated by reference.

BACKGROUND OF THE INVENTION

The present invention relates to a universal serial bus (USB) host system having a USB host function, and more particularly to memory access of a USB host controller.

Presently, the USB has become widespread as an interface for easily connecting peripherals to a personal computer (PC). The on-board percentage thereof has reached nearly 100%. In the USB Revision 2.0 standard (USB 2.0), in which speedup over its predecessor has been attempted, the maximum data transfer rate is defined as 480 Mbps. The USB 2.0 has therefore been increasingly adopted as the interface between AV equipment handling images and the like and PCs.

In recent years, not only PCs but also various types of equipment such as AV home appliances have been equipped with a USB host controller to have a function as a USB host, so that they are allowed to make use of various USB devices. Also, as for the USB host controller, only PC-oriented LSIs were initially available. Presently, however, LSIs intended for embedded devices and system LSIs incorporating the USB host function have been developed by various manufacturers.

USB hardware is classified into two types: USB hosts having a USB host controller and USB devices. In USB data transfer, a USB host always takes the lead to perform processing for a USB device.

USB data transfer is performed transaction by transaction, and one transaction is composed of a plurality of phases. For example, a data IN transaction is composed of a token phase in which a USB host issues IN token to a USB device, a data phase in which the USB host receives a data packet (transfer data) from the USB device, and a handshake phase in which the USB host notifies the USB device of success or failure of data reception. The maximum transfer data size that can be transferred in one transaction varies with the transfer type. The maximum transfer data size at full speed is 64 bytes in control transfer, bulk transfer and interrupt transfer, and 1023 bytes in isochronous transfer. The maximum transfer data size at high speed is 64 bytes in control transfer, 512 bytes in bulk transfer and 1024 bytes in interrupt transfer and isochronous transfer. In USB, a large size of data is transferred by repeating such a transaction.

When performing data transfer, a USB host uses management data containing information such as the transfer size, the transfer destination, the transfer state and the pointer to a transfer data buffer, to construct a transaction. When a plurality of transfer data units are to be transferred under a plurality of transactions, the USB host must read management data for each transaction to construct each transaction.

Hereinafter, a queue head (QH) and a queue element transfer descriptor (qTD), which are management data in bulk transfer according to Enhanced Host Controller Interface (EHCI) standard used as a USB 2.0 conforming host controller standard, will be described.

FIG. 8 is a view showing a configuration of QH, and FIG. 9 is a view showing a configuration of qTD.

In FIG. 8, 03-00H (801) refers to data including a queue head horizontal link pointer (QHLP), 0B-04H (802) refers to the characteristics of an end point used for USB transfer, and 0F-0CH (803) refers to the current pointer to qTD and the like. Also, 2F-10H (804) refers to information on the work space for the transaction, in which the transfer results of USB transfer and the like are stored in 27-14H (805).

In FIG. 9, 07-00H (901) refers to a pointer to the next qTD, 0B-08H (902) refers to the contents of the required transaction, and 1F-0CH (903) refers to pointers to transfer data buffers and the like.

Another example of the management data other than QH and qTD described above includes an isochronous transfer descriptor (iTD) used in isochronous transfer.

A USB host controller constructs a transaction using the management data described above, and using the resultant transaction, performs data read/write to a memory for storage of USB transfer data. The USB host controller then writes the transfer results, error information and the like into the management data, and thereafter acquires management data for subsequent data transfer to construct a next transaction.

As a conventional USB host system, a technique shown in FIG. 10 is known. FIG. 10 is a block diagram showing the entire configuration of the conventional USB host system.

Referring to FIG. 10, the USB host system 1005 includes: a CPU 1010 for controlling the entire of the USB host system 1005; a USB host controller 1001 having a USB host function and controlling USB transfer; and an external module 1004 having a function other than the USB host function. Memory access to a system memory 1003 from the CPU 1010, the USB host controller 1001 and the external module 1004 is made via a memory controller (M/C) 1002. Data transfer between the USB host system 1005 and the outside is performed via a USB 1006.

In the USB host system 1005 described above, transfer data 003 transferred from/to the outside is stored in the system memory 1003. Management data 004 used for construction of a transaction at the occasion of USB transfer is prepared and stored in the system memory 1003 by the CPU 1010.

Hereinafter, an operation of the USB host system 1005 described above will be described in which moving-picture data stored in a USB memory 1011 is read into the system memory 1003 and the external module 1004 performs playback processing for the moving-picture data.

Once receiving a request for USB data transfer from the external module 1004, the CPU 1010 prepares and stores management data 004 in the system memory 1003.

Based on an instruction from the CPU 1010, the USB host controller 1001 reads the management data 004 from the system memory 1003 to construct a transaction.

The USB host controller 1001 then reads moving-picture data from the USB memory 1011 based on the constructed transaction and stores the read transfer data 003 in the system memory 1003.

The external module 1004 then reads the transfer data 003 stored in the system memory 1003 by the USB host controller 1001 for playback processing and outputs the processed results to a display and the like.

In this configuration, the transfer data 003 read from the USB memory 1011 is stored in the system memory 1003 that is shared between the USB host controller 1001 and the external module 1004. The external module 1004 can therefore process the transfer data 003.

FIG. 11 is a diagrammatic view illustrating USB data transfer and processing of management information observed in execution of a USB read transaction in the USB host system 1005 of FIG. 10.

Once a USB-related transfer request is issued, the USB host controller 1001 reads QH of the management data 004 from the system memory 1003 and performs transfer setting based on the QH to construct a transaction (step S1101). The USB host controller 1001 then executes the transaction constructed in the step S101, to read/write transfer data 003 via USB to the system memory 1003, and records the transfer results, error information and the like as the execution results in the QH (step S1102). The USB host controller 1001 then makes qTD reflect the contents of the QH recorded in the step S1102 (step S1103), and shifts to the state of reading QH for the next transfer (step S1104). Thereafter, the external module 1004 accesses the system memory 1003 for readout of the transfer data 003 (step S1105).

In the steps S1101 to S1104 described above, the USB host controller 1001 accesses the management data 004 four times at the preparation of transfer information and the updating of the transfer state, and accesses the transfer data 003 once at the writing. Thereafter, in the step S1105, the external module 1004 accesses the transfer data 003 once at the readout.

FIG. 12 is a diagrammatic view illustrating memory access observed during execution of a simple USB read transaction in the USB host system 1005 of FIG. 10.

In FIG. 12, the x-axis represents the time, and both the USB host controller 1001 and the external module 1004 access the system memory 1003.

First, the USB host controller 1001 reads management data 004 from the system memory 1003 (1201) and constructs a transaction based on the management data 004 (1202). The USB host controller 1001 then records transfer data 003 received from outside the USB host system 1005 in the system memory 1003 based on the constructed transaction (1203). The USB host controller 1001 then makes the management data 004 in the system memory 1003 reflect the transfer state in the transaction (1204). Thereafter, the external module 1004 that has asked for the USB data transfer acquires the transfer data 003 from the system memory 1003 (1205).

The USB data transfer is completed by performing the series of processing 1201 to 1205. Once the external module 1004 completes the acquisition of the transfer data 003 from the system memory 1003, execution of subsequent USB data transfer is permitted. In transfer of a plurality of transfer data units, USB transfer processing 1206 to 1210 similar to the processing 1201 to 1205 described above is performed, in which the USB host controller 1001 reads management data 004 for a new transaction and performs processing such as construction/execution of the transaction.

As a USB host system, known is a technique described in International Publication No. WO/03/079200, for example. In the technique described in this document, management data stored in a system memory is fetched to a memory in a USB host module (data fetch unit), a transaction is constructed/executed using the fetched management data, and the transfer results of the transaction are fed back to the management data in the system memory, to thereby perform USB data transfer.

However, in the USB host system 1005, if the speed of the USB data transfer becomes insufficient, moving-picture playback processing by the external module 1004, for example, may not be performed normally, causing problems such as skipping of a frame and stop of a moving picture.

In the USB data transfer in the USB host system 1005, when the external module 1004 attempts to access the transfer data 003 in the system memory 1003 while the USB host controller 1001 is accessing the management data 004 in the system memory 1003, memory access contention occurs for the system memory 1003. Likewise, when the USB host controller 1001 attempts to access the management data 004 in the system memory 1003 while the external module 1004 is accessing the transfer data 003 in the system memory 1003, memory access contention occurs for the system memory 1003. Such memory access contention also occurs in the technique described in the above document.

If access contention occurs in the USB host system 1005 as described above, an arbitration function of the CPU 1010 serves to adjust the access. In this arbitration function, when the USB host controller 1001 is accessing the management data 004 in the system memory 1003, access from the external module 1004 to the transfer data 003 in the system memory 1003 is put in the standby state. This will cause a delay in moving-picture playback. In reverse, when the external module 1004 is accessing the transfer data 003 in the system memory 1003, access from the USB host controller 1001 to the management data 004 in the system memory 1003 is put in the standby state. As a result, it will take time to construct a transaction.

SUMMARY OF THE INVENTION

An object of the present invention is improving the transfer rate of a series of USB data transfer covering from construction/execution of a transaction to write transfer data stored in a USB device into a system memory until readout of the transfer data to an external module.

It is also an object of the present invention to improve the transfer rate of USB data transfer in the opposite direction, i.e., from the USB host system to the USB device.

According to the present invention, a USB host controller and an external module are configured to avoid occurrence of memory access contention, to thereby increase the USB data transfer rate. Specifically, the USB host system is provided with a dedicated memory for storing management data for USB data transfer.

Specifically, the USB host system of the present invention includes: a USB host module having a USB host function for performing USB transfer to/from a USB device; a different-function module having a predetermined function using transfer data that is to be an object of the USB transfer; at least one shared memory shared between the USB host module and the different-function module; and at least one dedicated memory exclusively used by the USB host module. At least part of management data for performing the USB transfer is stored in the dedicated memory.

According to the invention described above, in which the shared memory and the dedicated memory are provided in the USB host system, transfer data to be shared between the USB host module and the different-function module can be stored in the shared memory, and management data to be exclusively used by the USB host module can be stored in the dedicated memory. In this way, while maintaining the shared use of the transfer data between the USB host controller and the different-function module, it is possible to avoid access contention between memory access of the different-function module to the transfer data and memory access of the USB host controller to the management data.

Alternatively, the USB host system of the present invention includes: a USB host module having a USB host function for performing USB transfer to/from a USB device; a different-function module having a predetermined function using transfer data that is to be an object of the USB transfer; at least one shared memory shared between the USB host module and the different-function module, all of the transfer data in USB transfer being stored in the shared memory; and at least one dedicated memory placed in the USB host module for exclusive use by the USB host module, at least all of queue heads and queue element transfer descriptors in USB bulk transfer being stored in the dedicated memory.

The method for transferring transfer data of the present invention is a method for transferring transfer data from the USB device to the different-function module in the USB host system described above. The method includes: a transaction constructing step in which the USB host module reads management data stored in the dedicated memory and constructs a transaction; a transfer data storing step in which the USB host module reads transfer data from the USB device based on the transaction constructed in the transaction constructing step and stores the transfer data in the shared memory; a management data write step in which the USB host module writes transfer information on the data transfer in the transfer data storing step as the management data in the dedicated memory; and a transfer data read step in which, in parallel with the management data write step, the different-function module reads the transfer data stored in the shared memory in the transfer data storing step.

In the USB host system and the method for transferring transfer data according to the present invention, it is possible to avoid access contention between memory access of the USB host module and memory access of the different-function module, to permit simultaneous parallel execution of these memory access operations. Thus, with improvement in USB data transfer rate, the different-function module can secure the access time accessible to the transfer data, and the USB host controller can smoothly construct a transaction.

DESCRIPTION OF THE PREFERRED EMBODIMENTS

Hereinafter, a USB host system of an embodiment of the present invention will be described with reference to the accompanying drawings.

<Circuit Configuration, Memory Access>

Figure 1:
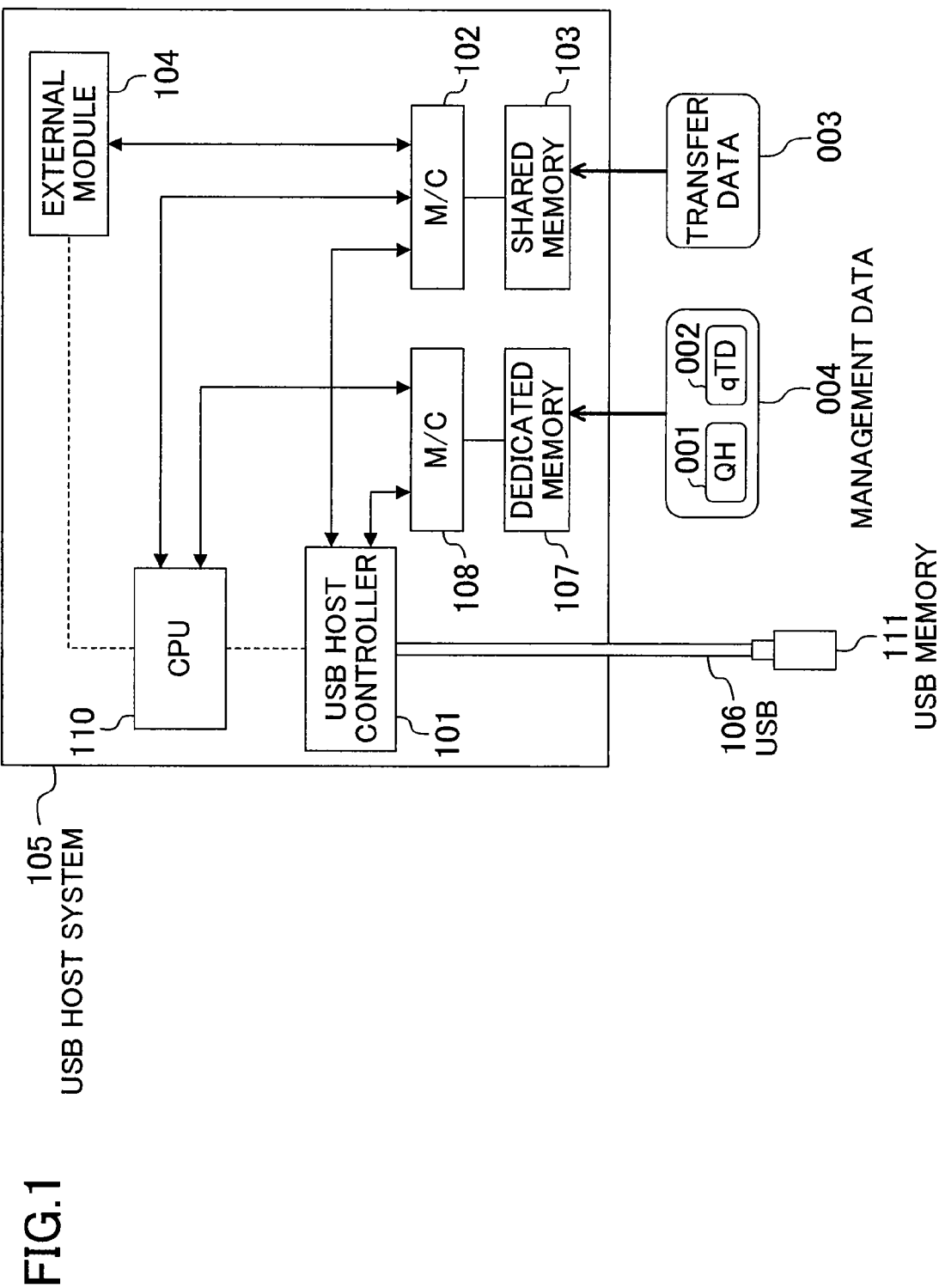
FIG. 1 is a block diagram showing the entire configuration of a USB host system of an embodiment of the present invention.

FIG. 1 is a block diagram showing the entire configuration of the USB host system of an embodiment of the present invention.

Referring to FIG. 1, the USB host system 105 includes: a CPU 110 for controlling the entire of the USB host system 105; a USB host controller (USB host module) 101 having a USB host function for performing USB transfer to/from a USB memory (USB device) 111; and an external module (different-function module) 104 having a predetermined function using transfer data 003 that is to be an object of the USB transfer. The transfer data 003 is moving-picture data, and the external module 104 has a moving-picture playback function for playing back the moving-picture data.

Inside the USB host system 105, also, provided are a shared memory 103 shared between the USB host controller 101 and the external module 104 and a dedicated memory 107 exclusively used by the USB host controller 101.

Access to the shared memory 103 and the dedicated memory 107 from the USB host controller 101 and the external module 104 is made via memory controllers (M/C) 102 and 108 for the memories 103 and 107, respectively. Data transfer to/from the USB memory 111 is performed via a USB 106.

The CPU 110 prepares and stores management data 004 for USB transfer in the dedicated memory 107 in response to a USB transfer request from the external module 104. The USB host controller 101 reads the management data 004 in the dedicated memory 107 under an instruction from the CPU 110, to construct a transaction. The transfer data 003 in USB transfer is stored in the shared memory 103 and shared between the USB host controller 101 and the external module 104.

Note that all of the transfer data 003 is stored in the shared memory 103 while all of the management data 004 is stored in the dedicated memory 107.

The management data 004 is a kind of data used when the USB host controller 101 constructs/manages transactions. It is herein assumed that the management data 004 includes QH 001 and qTD 002 in USB bulk transfer, and USB bulk transfer will be taken as an example in the following description.

Hereinafter, a simple example of operation of a USB read transaction will be described in which moving-picture data stored in the USB memory 111 is read into the shared memory 103 and then subjected to playback processing in the external module 104.

Once the external module 104 issues a request for USB data transfer to the CPU 110, the CPU 110 prepares and stores management data 004 (QH 001 and qTD 002) in the dedicated memory 107.

Thereafter, based on an instruction from the CPU 110, the USB host controller 101 reads the management data 004 from the dedicated memory 107 and constructs a transaction.

The USB host controller 101 then reads moving-picture data from the USB memory 111 based on the constructed transaction and stores the read transfer data 003 in the shared memory 103.

Thereafter, the external module 104 reads the transfer data 003 stored in the shared memory 103 by the USB host controller 101, performs playback processing for the transfer data 003, and outputs the processed results to a display and the like.

Figure 2:
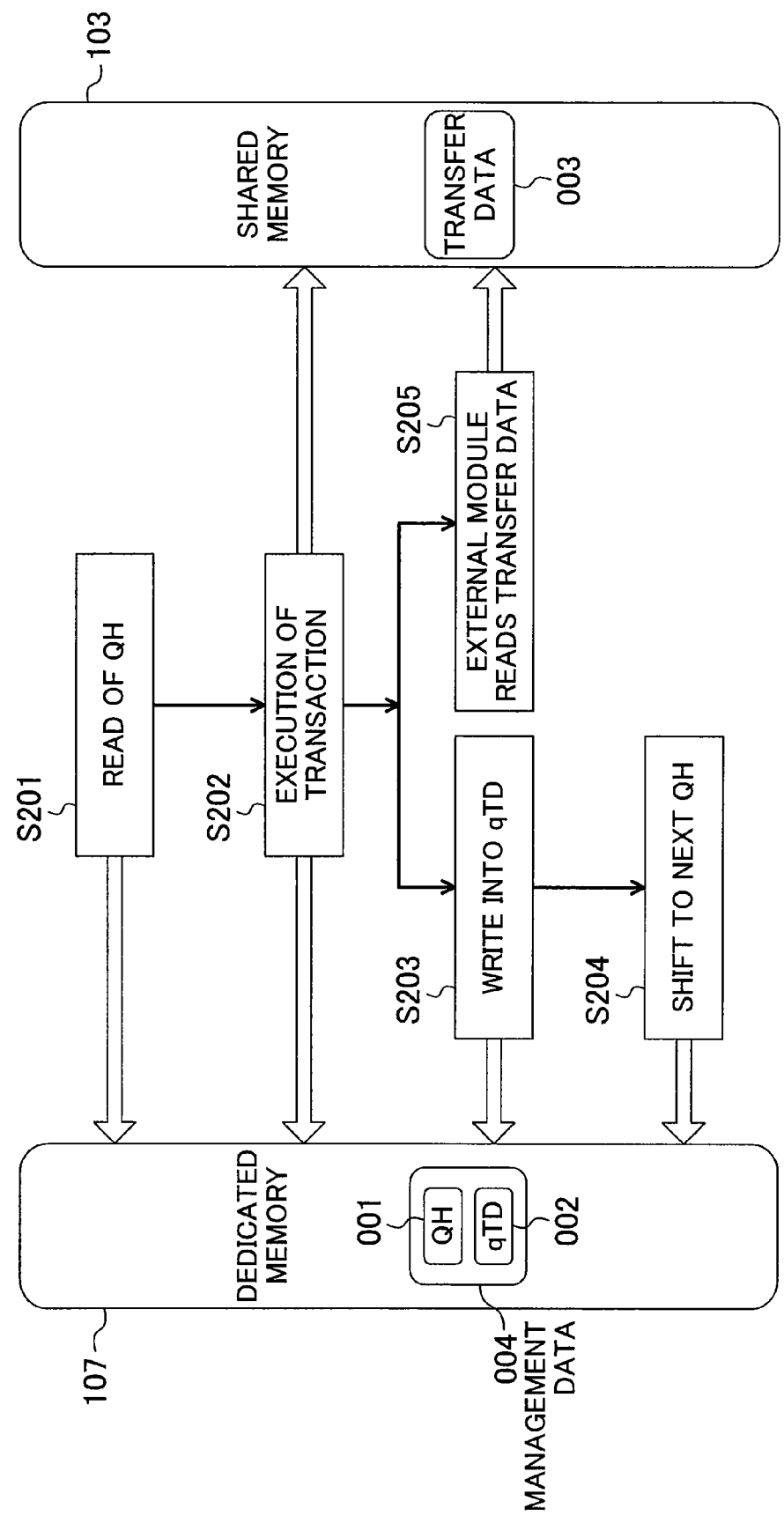
FIG. 2 is a diagrammatic view illustrating USB data transfer and processing of management information during execution of a USB read transaction in the USB host system of FIG. 1.

FIG. 2 is a diagrammatic view illustrating the USB data transfer and the processing of management information during execution of a USB read transaction in the USB host system 105 of FIG. 1.

Once a USB-related transfer request is issued, the USB host controller 101 reads QH 001 from the dedicated memory 107 and performs transfer setting based on the QH 001 to construct a transaction (step S201). The USB host controller 101 then executes the transaction constructed in the step S201, to write transfer data 003 in USB transfer to the shared memory 103, and records the transfer results, error information and the like as the execution results in the QH 001 (step S202).

The USB host controller 101 then makes qTD 002 reflect the contents of the QH 001 recorded in the step S202 (step S203), and shifts to the state of readout of QH 001 for the next transfer (step S204). In parallel with the steps S203 and S204 described above, the external module 104 accesses the shared memory 103 for reading the transfer data 003 (step S205).

In the steps S201 to S204 described above, the USB host controller 101 accesses the dedicated memory 107 four times at the preparation of transfer information and the updating of the transfer state, and accesses the shared memory 103 once at the writing. Also, in the step S205, the external module 104 accesses the shared memory 103 once at the readout.

Figure 3:
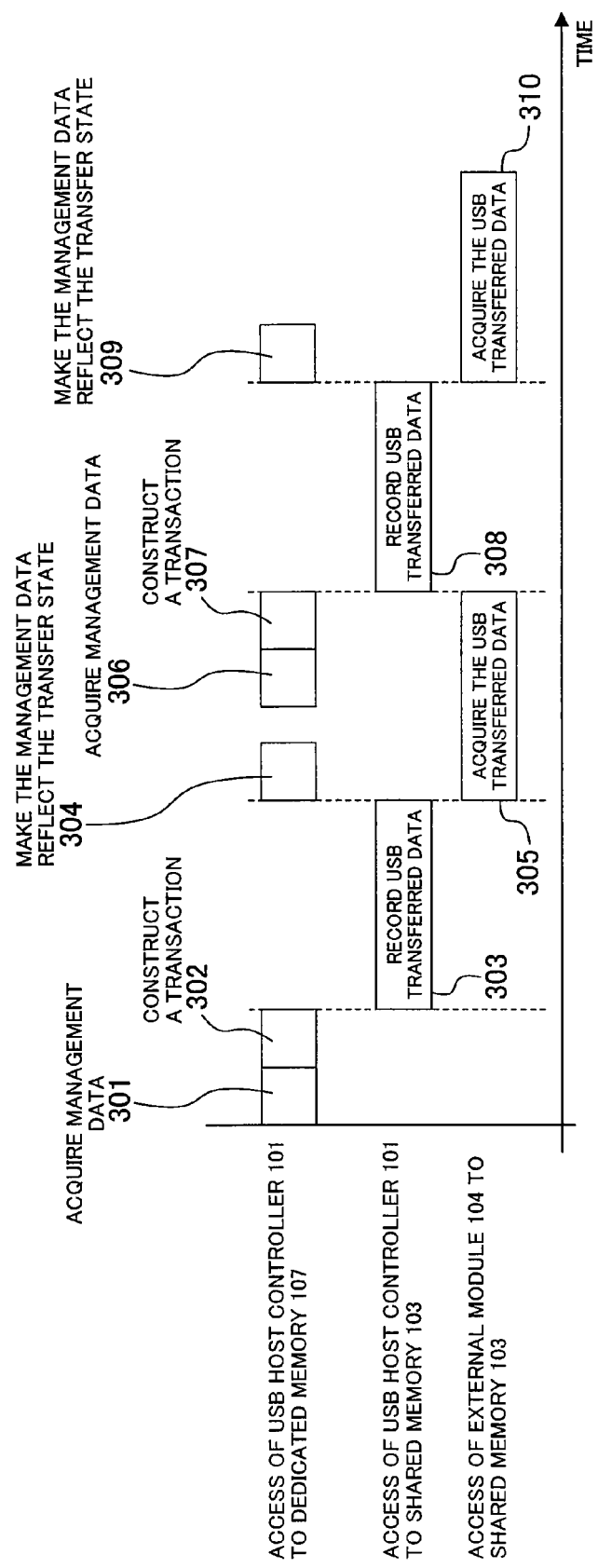
FIG. 3 is a diagrammatic view illustrating memory access during execution of a USB read transaction in the USB host system of FIG. 1.

FIG. 3 is a diagrammatic view illustrating memory access during execution of a USB read transaction in the USB host system 105 of FIG. 1.

In FIG. 3, the x-axis represents the time. The USB host controller 101 accesses both the dedicated memory 107 and the shared memory 103: that is, accessing the dedicated memory 107 for management data 004 and accessing the shared memory 103 for transfer data 003. The external module 104 accesses only the shared memory 103.

First, the USB host controller 101 reads management data 004 stored in the dedicated memory 107 and constructs a transaction (transaction constructing processing 301, 302).

The USB host controller 101 then reads transfer data 003 from the USB memory 111 based on the transaction constructed in the transaction constructing processing 301, 302 and records the transfer data 003 in the shared memory 103 (transfer data storing processing 303).

The USB host controller 101 then writes the data transfer state in the transfer data storing processing 303 as the management data 004 in the dedicated memory 107 (management data write processing 304).

In parallel with the management data write processing 304, the external module 104 that has asked for the USB data transfer reads the transfer data 003 stored in the shared memory 103 in the transfer data storing processing 303 (transfer data read processing 305).

The management data write processing 304 involves access to the dedicated memory 107 while the transfer data read processing 305 involves access to the shared memory 103. Therefore, after termination of the transfer data storing processing 303, the processing of acquiring the transfer data 003 by the external module 104 (transfer data read processing 305) can be performed in parallel with the processing of making the management data 004 reflect the transfer state by the USB host controller 101 (management data write processing 304) without causing memory access contention, thus permitting simultaneous execution of the write into the management data 004 and the readout of the transfer data 003. In other words, after the USB host controller 101 has written the transfer data 003 in the shared memory 103, the external module 104 can read the transfer data 003 for moving-image playback processing without causing any delay.

The next series of processing for USB transfer includes transaction constructing processing 306, 307 through transfer data read processing 310, which is substantially the same as the processing from the transaction constructing processing 301, 302 to the transfer data read processing 305 described above. In this new USB transfer, management data for transfer data next to the transfer data 003 stored in the shared memory 103 is read from the dedicated memory 107 to construct a transaction in the transaction constructing processing 306, 307 during the time when the external module 104 is reading the transfer data 003 from the shared memory 103.

The transfer data read processing 305 involves access to the shared memory 103 while the transaction constructing processing 306, 307 involves access to the dedicated memory 107. No memory access contention will therefore occur even when the transfer data read processing 305 and the transaction constructing processing 306, 307 are performed in parallel. Hence, when the external module 104 is under access to the shared memory 103 reading the transfer data 003 to perform moving-picture playback processing, the USB host controller 101 can access the dedicated memory 107 reading the management data 007 and construct a new transaction. In other words, after the USB host controller 101 has written the transfer data 003 in the shared memory 103 in the preceding transaction, the USB host controller 101 can read management data 004 for the next transaction and construct the next transaction without causing any delay.

Figure 4:
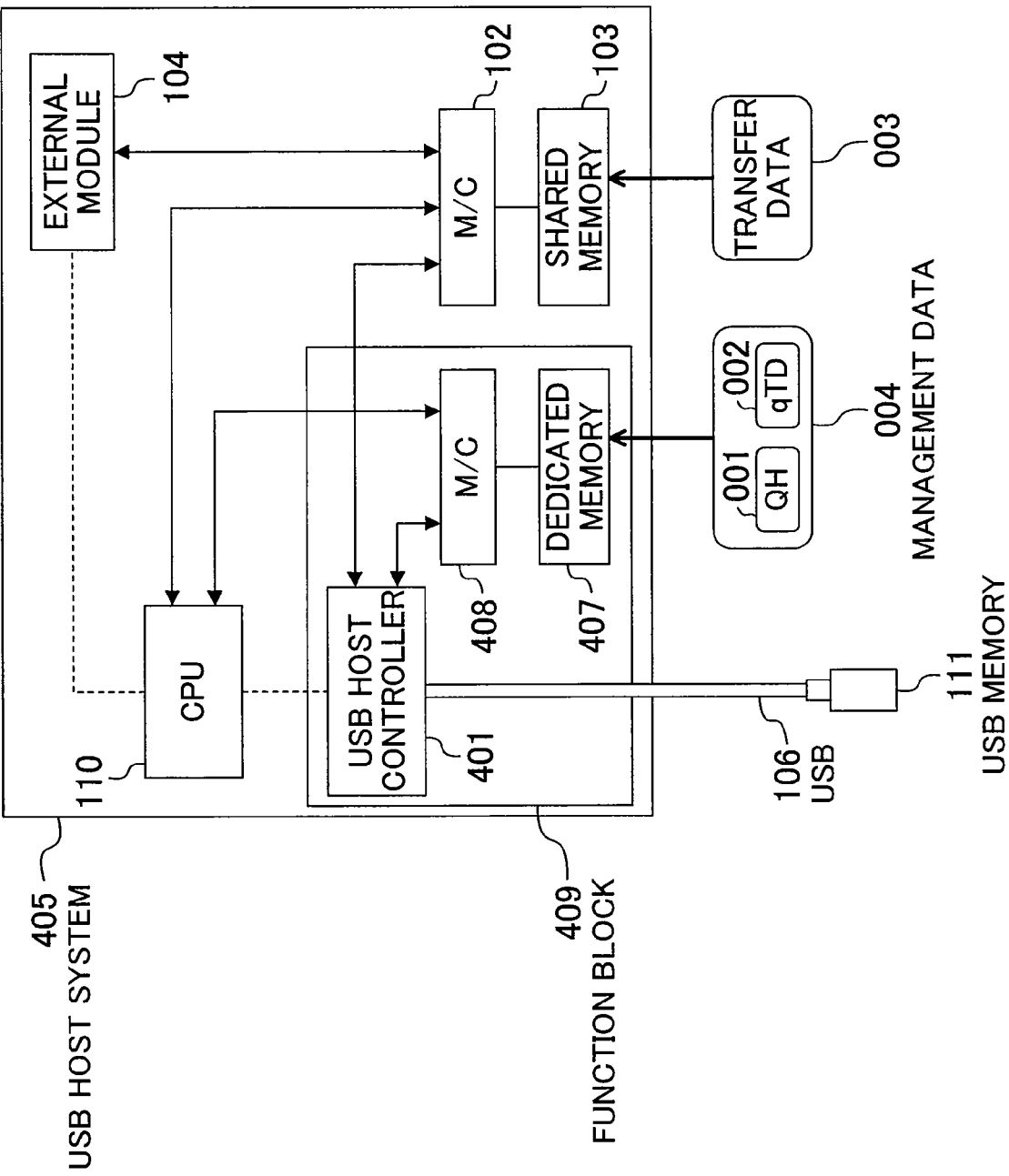
FIG. 4 is a block diagram showing the entire configuration of an alteration to the USB host system of FIG. 1.

Another USB host system of this embodiment will be described. FIG. 4 is a block diagram showing the entire configuration of an alteration to the USB host system of FIG. 1.

The USB host system 405 of FIG. 4 is different from the USB host system 105 of FIG. 1 in that a USB host controller 401, a dedicated memory 407 and a memory controller (M/C) 408 corresponding to the dedicated memory 407 are incorporated in the USB host system 405 as one function block 409. In this configuration, the function block 409 is considered as the USB host module. The dedicated memory 407 is therefore placed inside the USB host module 409. The other configuration is substantially the same as that of the USB host system 105 of FIG. 1, and thus the description thereof is omitted here.

Figure 5:
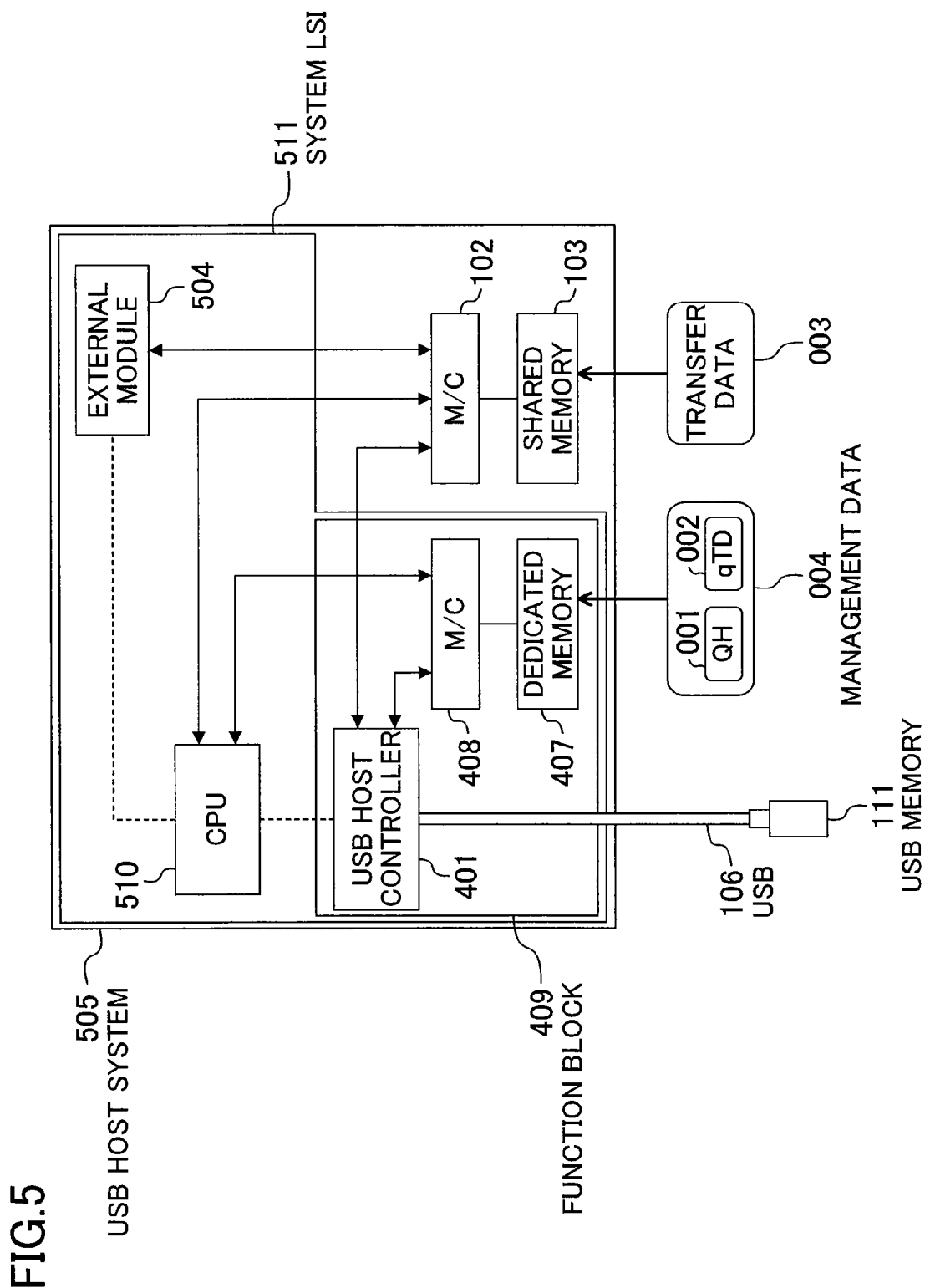
FIG. 5 is a block diagram showing the entire configuration of another alteration to the USB host system of FIG. 1.

FIG. 5 is a block diagram showing the entire configuration of another alteration to the USB host system of FIG. 1.

The USB host system 505 of FIG. 5 is different from the USB host systems 105 and 405 of FIGS. 1 and 4 in that a function block 409 having a USB host controller 401, a dedicated memory 407 and a memory controller (M/C) 408, a CPU 510 and an external module 504 are placed on one chip as a system LSI 511, and the system LSI 511 is incorporated in the USB host system 505. In this configuration, also, the function block 409 is considered as the USB host module. The other configuration is substantially the same as those of the USB host systems 105 and 405 of FIGS. 1 and 4, and thus the description thereof is omitted here.

In the USB host system according to the present invention having any of the constructions in FIGS. 1, 4 and 5, the operation of the USB host controller 101, 401 and the USB transfer control method are substantially the same.

<Memory Allocation>

Hereinafter, allocation of data to be stored in the USB host system of this embodiment will be described.

Table 1 shows allocation of data to be stored in the shared memory and the dedicated memory (memory allocation) in the USB host system of this embodiment.

TABLE 1

| Combination | Dedicated memory | Shared memory |
|---|---|---|
| 1 | All of management data | All of transfer data |

TABLE 1-continued

| Combination | Dedicated memory | Shared memory |
|---|---|---|
| 2 | All of management data Part of transfer data | The remainder of transfer data |
| 3 | Part of management data | The remainder of management data All of transfer data |
| 4 | Part of management data Part of transfer data | The remainder of management data The remainder of transfer data |

In Table 1, combination 1 is a memory allocation in which all of the management data 004 in USB transfer is stored in the dedicated memory 107, 407, and all of the transfer data 003 in USB transfer is stored in the shared memory 103.

Combination 2 is a memory allocation in which all of the management data and part of the transfer data are stored in the dedicated memory 107, 407, and the remainder of the transfer data 003 is stored in the shared memory 103. As the allocation of the transfer data 003, frequently used data blocks may be stored in the dedicated memory 107, 407 while the other data blocks may be stored in the shared memory 103. Examples of frequently used data blocks include a command block wrapper (CBW) and a command status wrapper (CSW) used in performing USB bulk transfer according to Bulk-only Transport (BOT) standard. The CBW is a data block whose data size is fixed to 31 bytes, and the CSW is a data block whose data size is fixed to 13 bytes. The CBW and CSW, which are types of transfer data in USB transfer, are used as a command and a status in the BOT-compliant USB transfer. Specifically, after transfer of a 31-byte CBW, various actual data units in the transfer data are transferred, and thereafter a 13-byte CSW is transferred. These data blocks may be stored in the dedicated memory 107, 407 in which the management data 004 is also stored.

Combination 3 is a memory allocation in which part of the management data is stored in the dedicated memory 107, 407, and the remainder of the management data and all of the transfer data are stored in the shared memory 103. As the allocation of the management data 004, in bulk transfer, for example, QH may be stored in the dedicated memory 107, 407 while qTD may be stored in the shared memory 103.

Combination 4 is a memory allocation in which part of the management data and part of the transfer data are stored in the dedicated memory 107, 407, and the remainder of the management data and the remainder of the transfer data are stored in the shared memory 103.

Whichever combination is adopted among the combinations 1 to 4 described above, the operation of the USB host system 105 is substantially the same although the memory to which reference is made for data is changed. Description of the operation is therefore omitted here.

Which one of the combinations 1 to 4 described above should be selected is determined with the configuration of the USB host system, the data size of the transfer data 003 handled, the memory sizes of the shared memory 103 and the dedicated memory 107, 407 and the degree of access contention in the shared memory 003. For example, a specific data unit in the transfer data 003, such as a frequently used data block described above, may be stored in the dedicated memory 107, 407 in addition to the management data 004, and this can efficiently reduce access contention in the shared memory 103. Also, if a memory having a sufficiently large capacity can be used as the dedicated memory 107, 407, all the data including the transfer data 003 may be stored in the dedicated memory 107, 407 to thereby eliminate access contention in the shared memory 103.

<USB Driver>

Hereinafter, data transfer processing by the USB host controller and a USB host driver in the USB host system of the present invention will be described.

Figure 6:
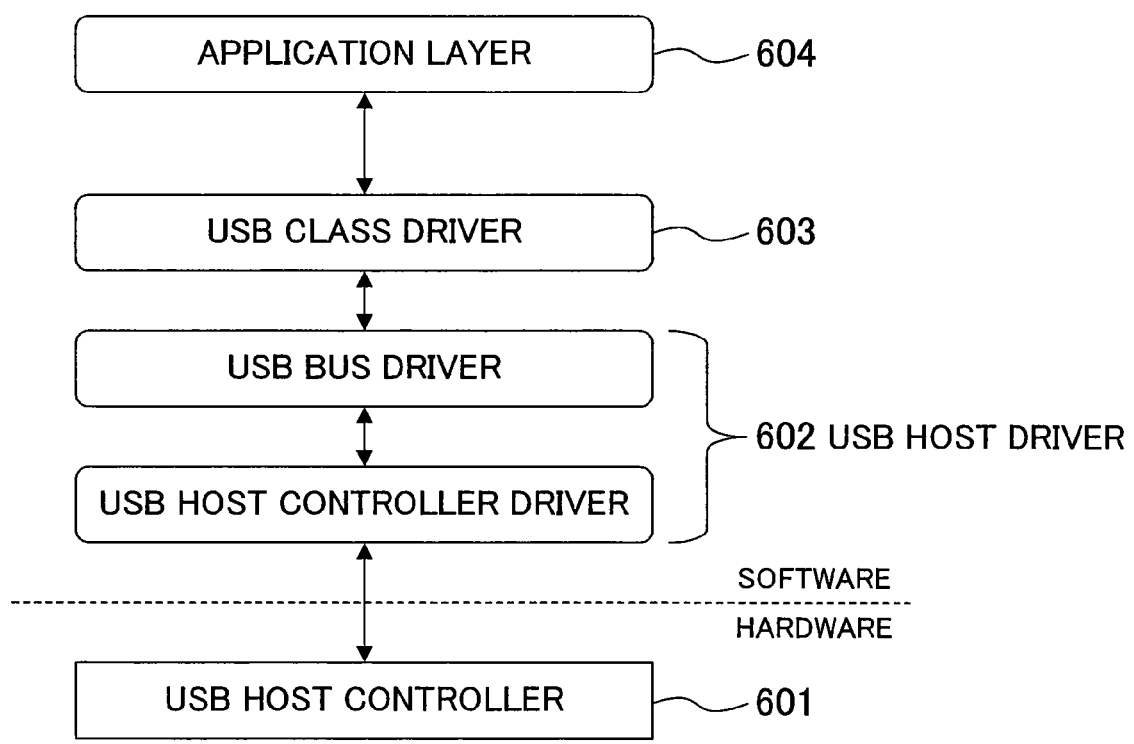
FIG. 6 is a diagrammatic view illustrating the relationship between the USB host controller and USB-related software.

FIG. 6 is a diagrammatic view illustrating the relationship between the USB host controller and USB-related software.

Note that as used herein a USB bus driver and a USB host controller driver are collectively called a USB host driver 602. The USB host driver 602 controls a USB host controller 601 to execute access to the system memory and USB communication. A USB class driver 603, a driver at a high level above the USB host driver 602, mainly performs protocol control in USB communication. An application layer 604 is software for an external module in the USB host system. The relationship among the application layer 604, the USB class driver 603 and the USB host driver 602 is as follows, for example. In response to a request for reading transfer data stored in the USB memory from the application layer 604, the USB class driver 603 manages the transfer protocol, and the USB host driver 602 generates management data corresponding to a transaction required to read the transfer data.

The software processing by the USB host driver 602, the USB class driver 603 and the application layer 604 is executed by the CPU in the USB host system. The processing of transferring the transfer data from the USB device and the like are executed by the USB host controller 601 under instructions from the USB host driver 602.

Figure 7:
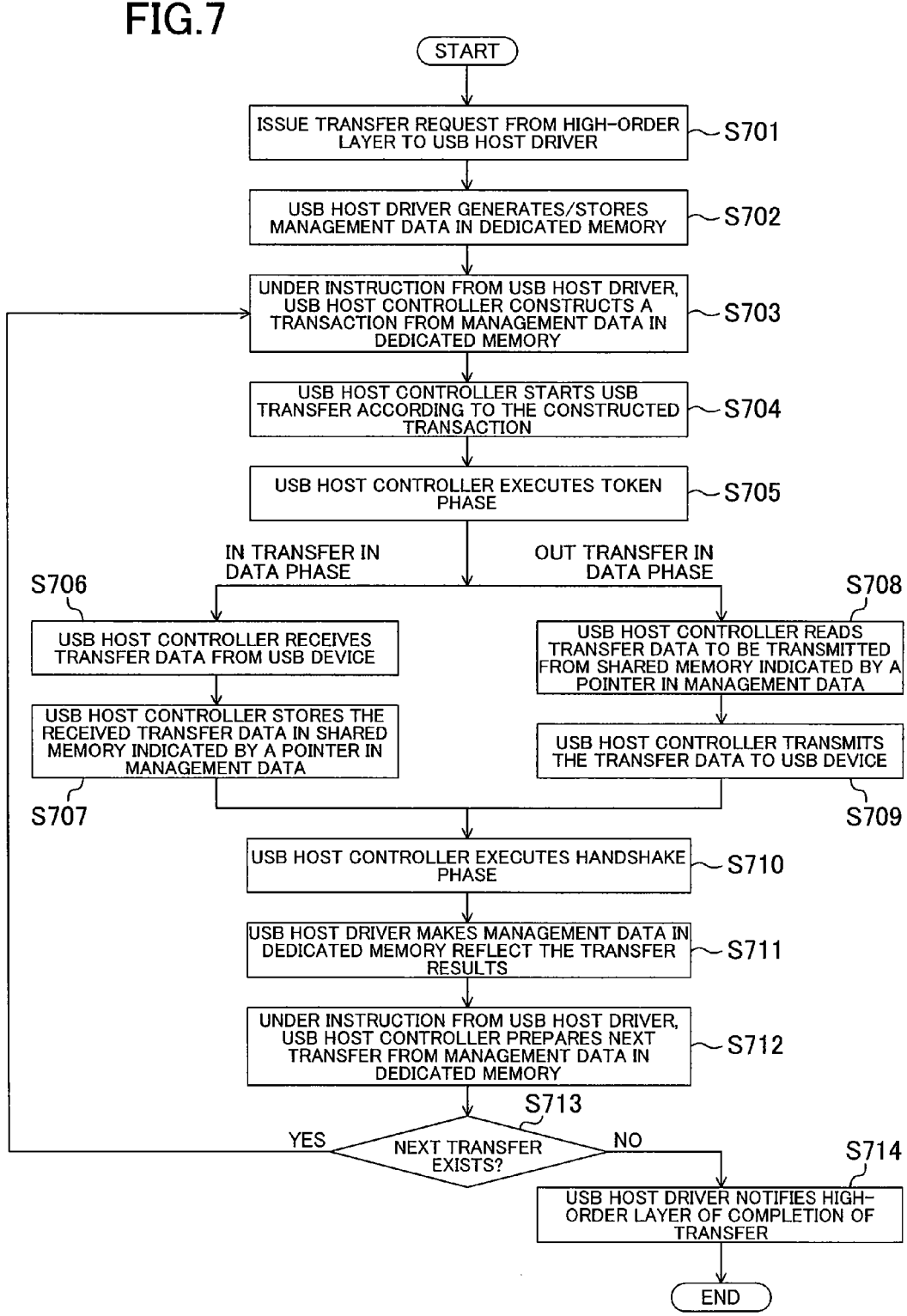
FIG. 7 is a flowchart of processing in bulk transfer in the USB host system of an embodiment of the present invention.
Figure 8:
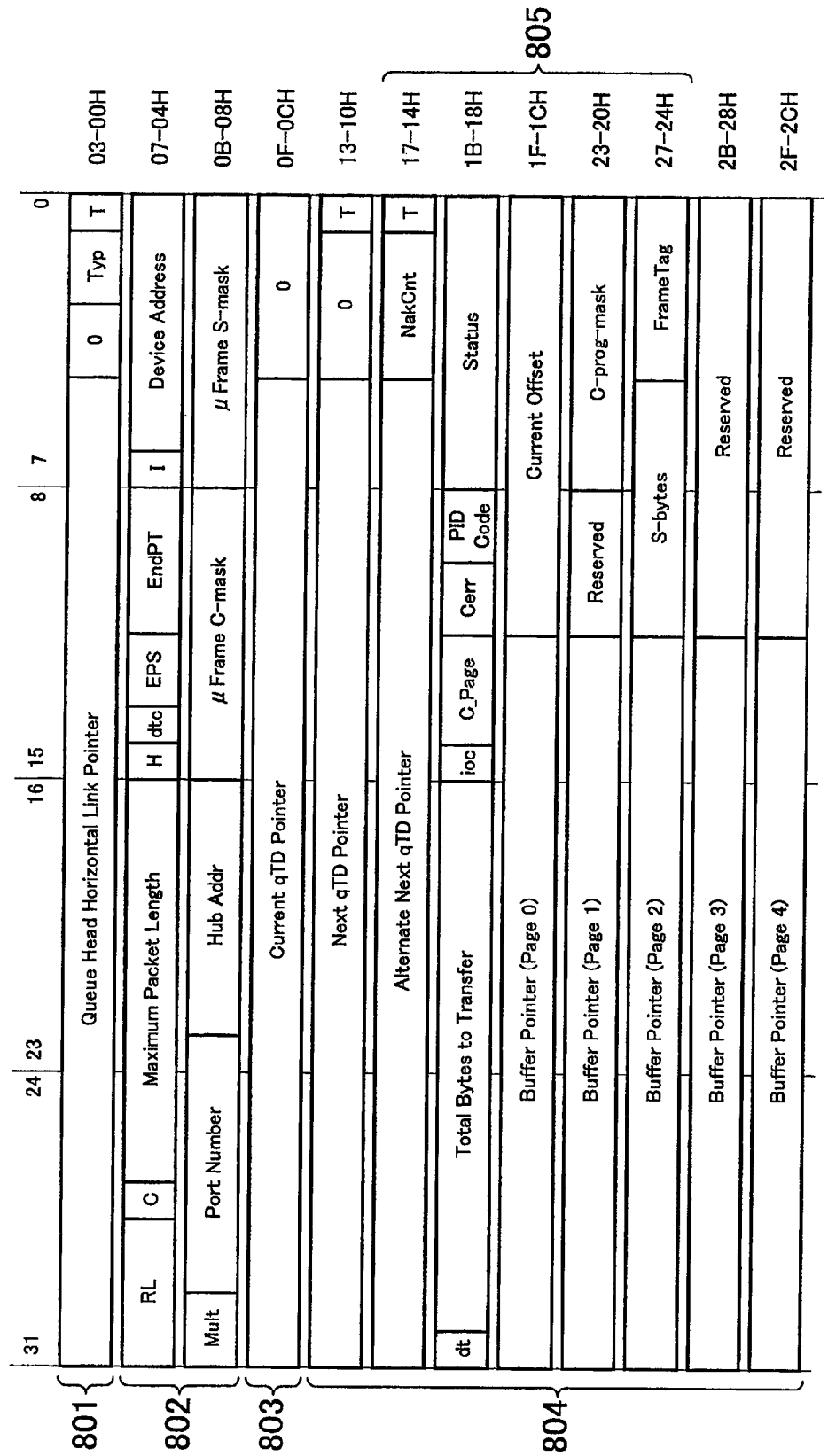
FIG. 8 is a view showing a configuration of QH.
Figure 9:
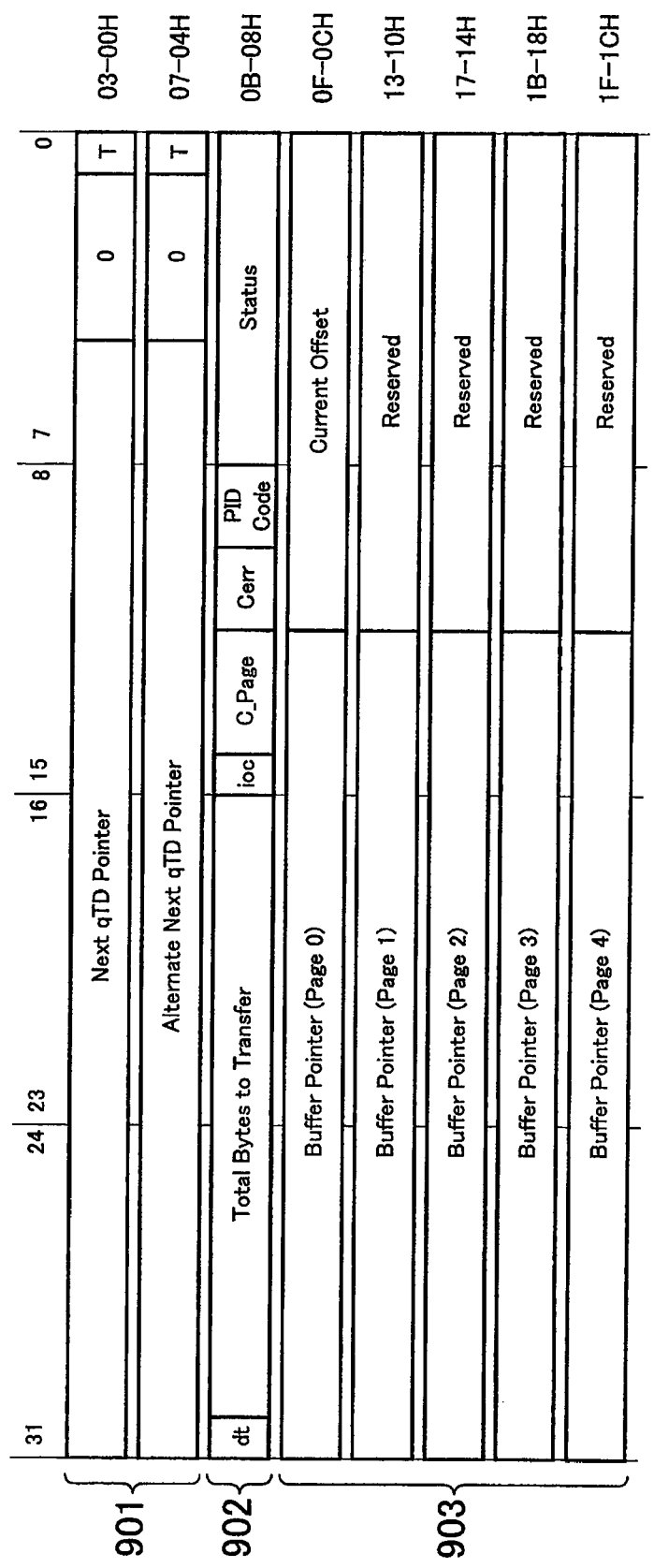
FIG. 9 is a view showing a configuration of qTD.
Figure 10:
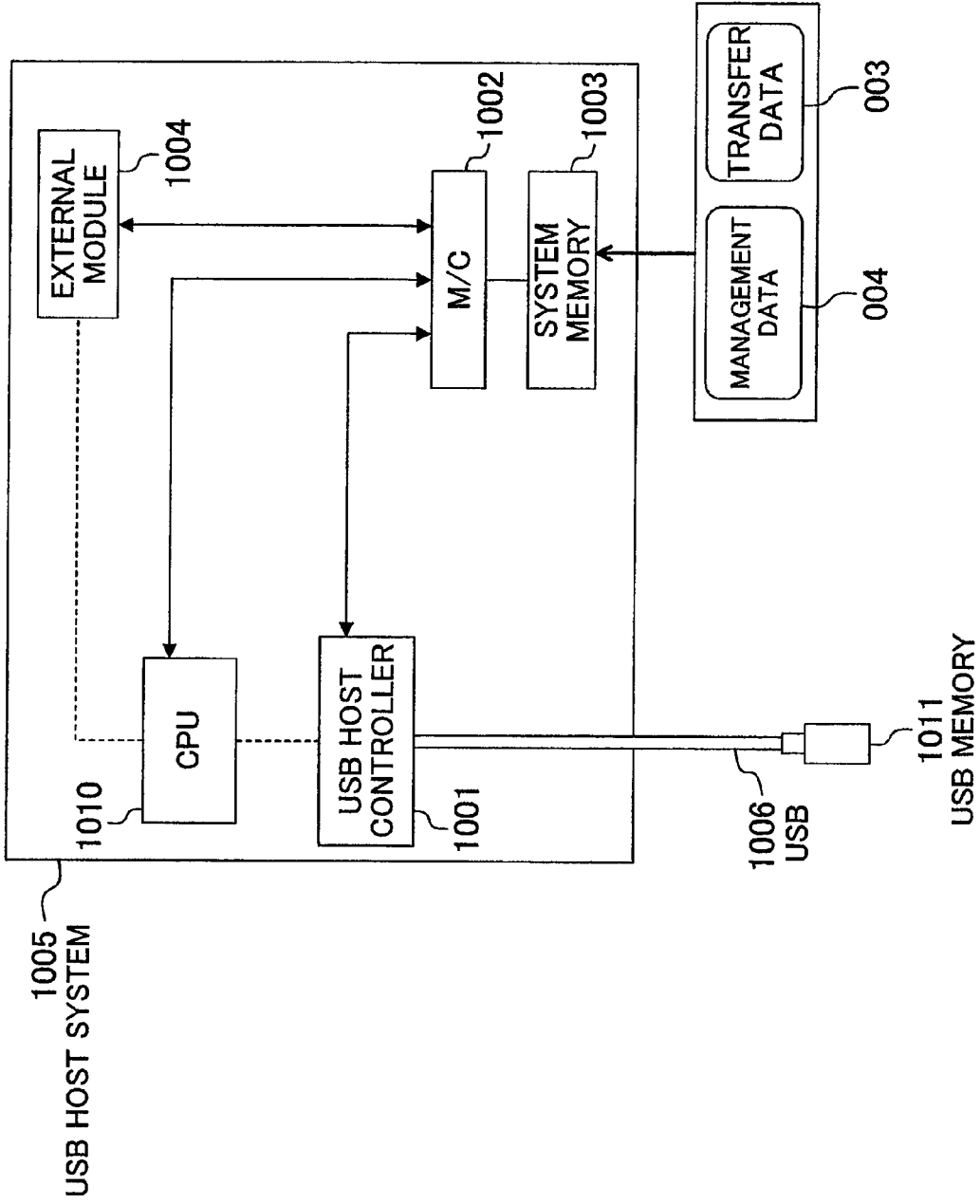
FIG. 10 is a block diagram showing the entire configuration of a conventional USB host system.
Figure 11:
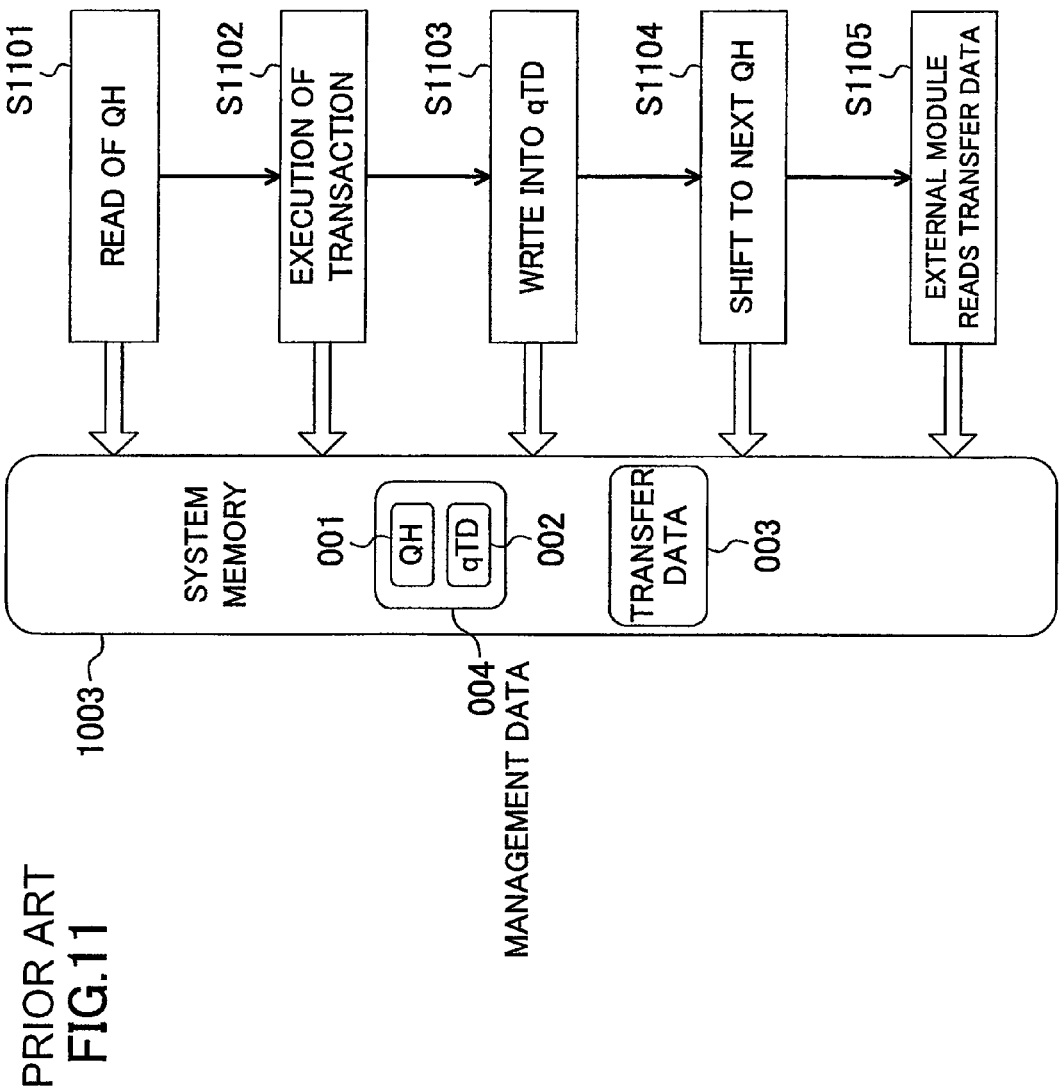
FIG. 11 is a diagrammatic view illustrating USB data transfer and processing of management information during execution of a USB read transaction in the USB host system of FIG. 10.
Figure 12:
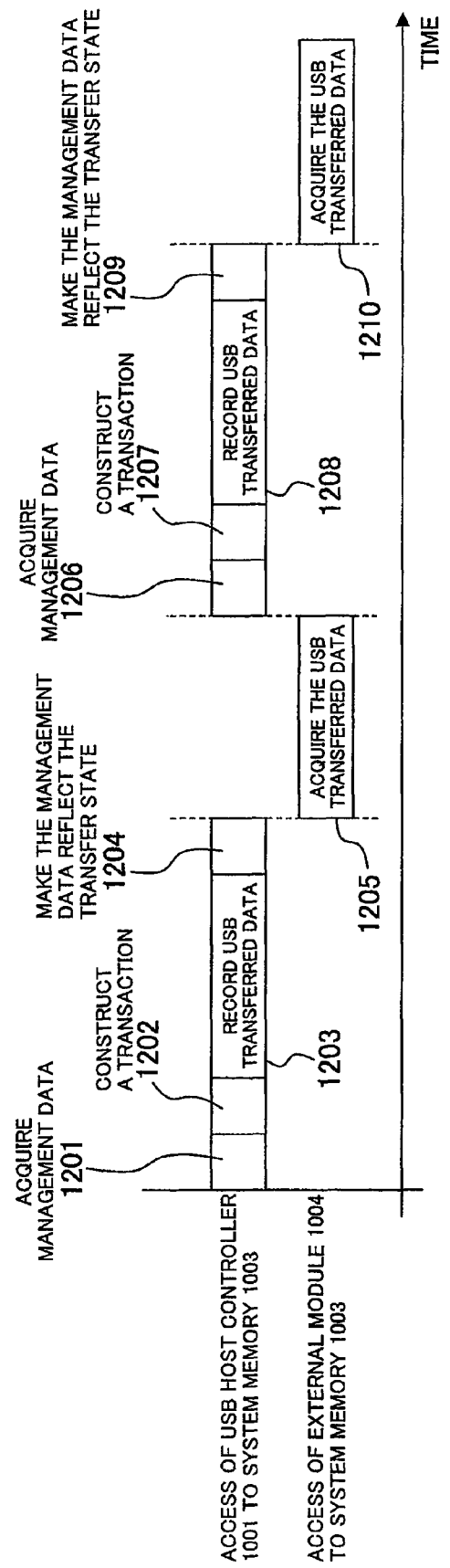
FIG. 12 is a diagrammatic view illustrating memory access during execution of a USB read transaction in the USB host system of FIG. 10.

FIG. 7 is a flowchart of processing in bulk transfer in the USB host system of an embodiment of the present invention.

Note that the USB host system 405 whose entire configuration is shown in FIG. 4 and the memory allocation of combination 1 in Table 1 were adopted in the following processing in USB bulk transfer.

In USB data transfer, a transfer request is issued from the application layer 604 and the USB class driver 603 (high-order layers), both operating on the CPU 110, to the USB host driver 602 (step S701). The USB host driver 602, having received the transfer request, generates management data 004 corresponding to a required transaction according to the transfer request (step S702). If large data is to be transferred, a plurality of transactions will be necessary to complete the transfer of the data. Therefore, a plurality of units of management data 004 should be generated for the plurality of transactions.

Once the generation of the management data 004 is completed, actual communication processing is started.

Under an instruction from the USB host driver 602, the USB host controller 401 reads information of the management data 004 from the dedicated memory 407 to construct a transaction (step S703), and starts transfer of transfer data 003 using the constructed transaction (step S704). In USB data communication, the USB host controller 401 first executes the token phase (step S705). In the step S705, IN token is issued in the token phase if the data phase includes IN-direction data transfer, or OUT token is issued in the token phase if it includes OUT-direction data transfer.

In the data phase, in the case of IN-direction data transfer, the USB host controller 401 receives transfer data 003 from the USB device as the other party of the communication (step S706), and stores the received transfer data 003 in the shared memory 103 at a position indicated by a pointer in the management data 004 (step S707).

In the case of OUT-direction data transfer, the USB host controller 401 reads transfer data 003 to be transmitted from a position in the shared memory 103 indicated by a pointer in the management data 004 (step S708) and transmits the transfer data 003 to the USB device as the other party of the communication (step S709).

The USB host controller 401 then executes the handshake phase (step S710). Thereafter, the USB host driver 602 makes the management data 004 in the dedicated memory 407 reflect the results of the USB data transfer (step S711).

With the processing in the steps S701 to S711, the communication processing of USB transfer for one transaction is completed.

Thereafter, under an instruction from the USB host driver 602, the USB host controller 401 acquires information on next USB data transfer from the management data 004 in the dedicated memory 407 (step S712), to determine whether or not there is next USB data transfer (step S713).

If there is next USB data transfer, the process returns to the step S703 to construct the next transaction and perform USB data transfer by following the processing flow described above.

If there is no next USB data transfer, the USB host driver 602 notifies the application layer 604 and the USB class driver 603 both operating on the USB host system 405 of completion of the USB data transfer (step S714), and the process is completed.

In the processing flow described above, even when the memory allocation and the memory configuration used are changed, the software and hardware processing will be the same, because with this change, changed are only the place where the management data 004 generated/processed by the USB host driver 602 is stored, the place where the transfer data 003 to be read/written is stored and the setting of a pointer in the management data 004 indicating the place where the transfer data is stored.

As described above, in this embodiment, both the shared memory 103 and the dedicated memory 107, 407 are provided in the USB host system 105, 405, 505, in which the transfer data 003 to be shared between the USB host controller 101, 401 and the external function module 104, 504 is stored in the shared memory 103 and the management data 004 to be exclusively used by the USB host controller 101 is stored in the dedicated memory 107, 407. Hence, while maintaining the shared use of the transfer data 003 between the USB host controller 101, 401 and the external function module 104, 504, it is possible to avoid access contention between memory access of the external module 104, 504 to the transfer data 003 and memory access of the USB host controller 101, 401 to the management data 004. This permits simultaneous parallel execution of these memory access operations, and thus improvement in USB data transfer rate. Thus, the external module 104, 504 can secure the access time accessible to the transfer data 003, and the USB host controller 101, 401 can access the management data 004 and smoothly construct a transaction.

In this embodiment, one shared memory 103 and one dedicated memory 107, 407 are provided in the USB host system 105, 405, 505. Alternatively, naturally, each of the shared memory 103 and the dedicated memory 107, 407 may be composed of a plurality of memories.

Although all of the management data 004 is stored in the dedicated memory 107, 407, at least part of the management data 004 may be stored therein.

Naturally, part or all of the USB host system 105, 405, 505 of FIG. 1, 4 or 5 may be placed on one chip as a system LSI.

As described above, according to the present invention, it is possible to avoid access contention between memory access of the USB host module and memory access of the external module, to permit simultaneous parallel execution of these memory access operations and thus improve the USB data transfer rate. Therefore, the present invention is particularly useful as a USB host system and the like in an embedded device that needs to secure the USB data transfer rate in a computer resource-poor environment.

While the present invention has been described in a preferred embodiment, it will be apparent to those skilled in the art that the disclosed invention may be modified in numerous ways and may assume many embodiments other than that specifically set out and described above. Accordingly, it is intended by the appended claims to cover all modifications of the invention which fall within the true spirit and scope of the invention.

What is claimed is:

1. A method for transferring transfer data from a USB (universal serial bus) device to a module in a USB host system, the USB host system comprising a USB host controller having a USB host function for performing USB transfer to/from the USB device;

the module having a predetermined function using transfer data that is to be an object of the USB transfer;

at least one shared memory shared between the USB host controller and the module; and at least one dedicated memory exclusively used by the USB host controller, wherein at least part of management data for performing the USB transfer is stored in the dedicated memory, the method comprising:

a transaction constructing step in which the USB host controller reads management data stored in the dedicated memory and constructs a transaction; a transfer data storing step in which the USB host controller reads transfer data from the USB device based on the transaction constructed in the transaction constructing step and stores the transfer data in the shared memory;

a management data write step in which the USB host controller writes transfer information on the data transfer in the transfer data storing step as the management data in the dedicated memory; and a transfer data read step in which, in parallel with the management data write step, the module reads the transfer data stored in the shared memory in the transfer data storing step.

2. The method of claim 1, wherein when the module is reading the transfer data in the shared memory in the transfer data read step, the USB host controller reads management data on transfer data next to the transfer data stored in the shared memory from the dedicated memory and constructs a transaction in the transaction constructing step.

* * * * *